United States Patent [19]
Garforth et al.

[11] Patent Number: 6,068,693
[45] Date of Patent: May 30, 2000

[54] METHOD FOR SEPARATING MIXTURE OF FINELY DIVIDED MINERALS AND PRODUCT THEREOF

[75] Inventors: William L. Garforth, Sandersville; Robert J. Pruett, Milledgeville; Dona L. Archer, Sandersville; Jun Yuan, Milledgeville; Michael J. Garska; H. Vince Brown, both of Sandersville, all of Ga.

[73] Assignee: ECC International Inc., Roswell, Ga.

[21] Appl. No.: 08/876,523

[22] Filed: Jun. 16, 1997

[51] Int. Cl.⁷ .............................. C04B 33/04; C09C 1/42; B03B 1/04
[52] U.S. Cl. ..................... 106/487; 106/287.1; 106/488; 501/148; 209/5; 209/10; 209/172
[58] Field of Search .................................. 106/488, 487, 106/499, 287.1, 416; 501/146, 148; 209/172, 5, 10, 166

[56] References Cited

U.S. PATENT DOCUMENTS

| | | |
|---|---|---|
| 3,857,781 | 12/1974 | Maynard . |
| 4,088,732 | 5/1978 | Maynard et al. . |
| 4,105,466 | 8/1978 | Kunkle et al. . |
| 4,468,317 | 8/1984 | Turner, Jr. . |
| 4,604,369 | 8/1986 | Shi . |
| 5,147,458 | 9/1992 | Skipper et al. . |
| 5,154,767 | 10/1992 | Kunkle et al. . |
| 5,190,615 | 3/1993 | Kunkle et al. . |
| 5,385,239 | 1/1995 | Kunkle et al. . |
| 5,535,890 | 7/1996 | Behl et al. . |
| 5,573,658 | 11/1996 | Kunkle et al. . |
| 5,584,394 | 12/1996 | Behl et al. ............................ 106/416 |
| 5,603,411 | 2/1997 | Williams et al. . |

*Primary Examiner*—Michael Marcheschi
*Attorney, Agent, or Firm*—Suzanne Kikel

[57] ABSTRACT

A method of enhancing the brightness and increasing the yield of a kaolin clay by optimizing the removal of the titania and mica impurities in the clay and the amount of clay remaining in the slurry is disclosed. The method is a selective flocculation process wherein the clay is blunged, dispersed, and conditioned before flocculation. In the flocculation step, a high molecular weight anionic polymer and a low molecular weight anionic polymer, such as sodium polyacrylate, are added to the slurry after the conditioning process, whereby the titania-mica enriched flocs are separated from the suspension which is enriched with kaolin. This final kaolin product has titania levels ranging from 0.1% to 0.5%, a reduced mica level, a high usable product yield, and a brightness greater than 89.5 and at least 91.5.

15 Claims, 1 Drawing Sheet

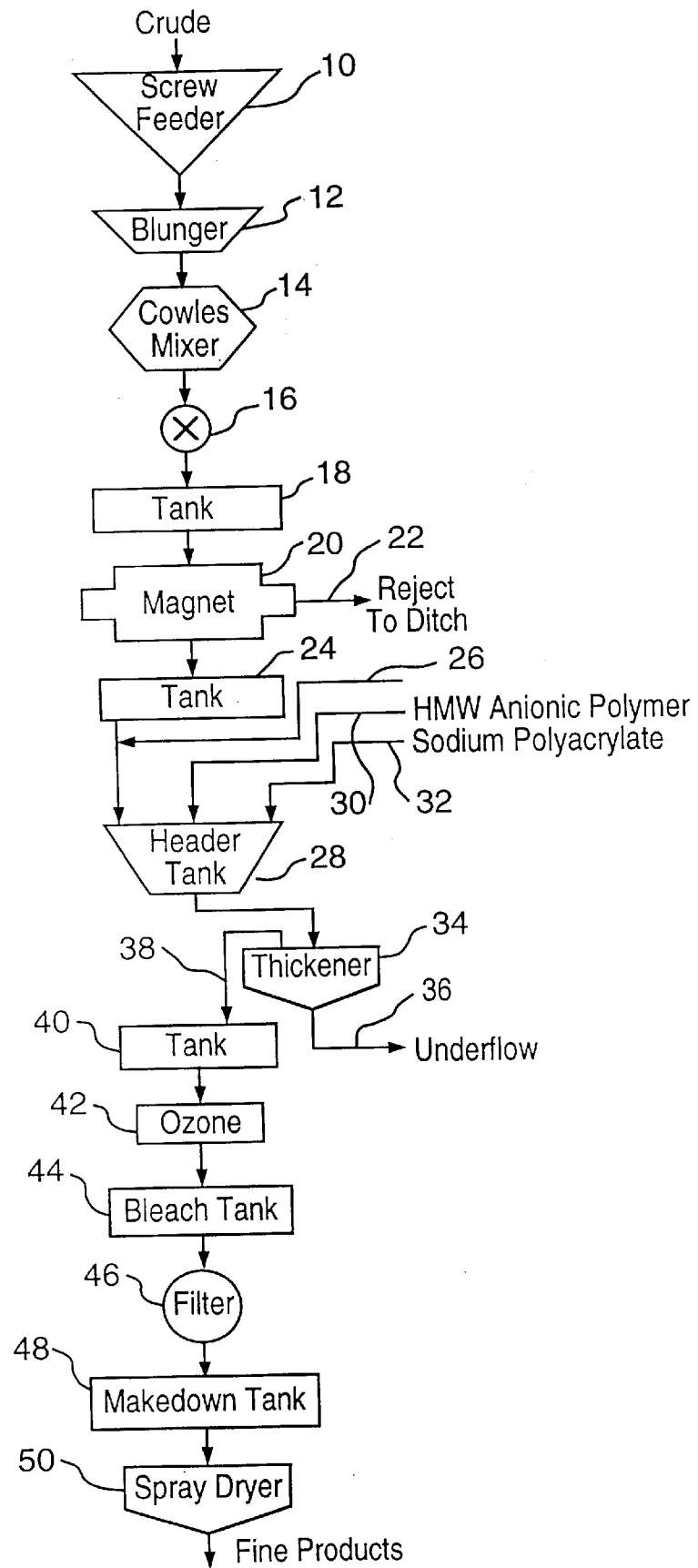

6,068,693

METHOD FOR SEPARATING MIXTURE OF FINELY DIVIDED MINERALS AND PRODUCT THEREOF

BACKGROUND OF THE INVENTION

1. Field of the Invention

This invention relates to a process for separating a mixture of finely divided minerals into constituents thereof. In particular, the invention relates to a procedure for effecting such separation by a selective flocculation technique wherein both a high molecular weight polymer and a low molecular weight polymer are added to an aqueous slurry containing the mixture of minerals to produce a high yield product which is low in impurities. This invention is especially adapted to the separation of colored impurities, such as titania (anatase and rutile) and micas, from kaolin clay.

2. Description of Related Art

When particles of mineral ore or powder mixtures are sufficiently large, for example, larger than 325 (U.S.) mesh, the components of the mixture can be separated by simple physical means such as air or magnetic separation. When particles are finer, more sophisticated technology may be needed to bring about efficient separations. It is conventional to make the separation of finely divided mineral, e.g., particles finer than 325 mesh, by forming the mixture into an aqueous pulp or slurry and adding chemicals that will bring about a desired separation. One widely used method is froth flotation. In the case of froth flotation of phosphate or oxidized minerals from siliceous gangue, it is conventional to use a fatty acid collector and a salt promoter.

The fatty acid collector coats the mineral particles, which are separated from the siliceous gangue in the form of a froth, and a clay dispersant may be used to keep the clay particles dispersed during the froth flotation process. In the case of kaolin clays which contain significant amount of sub-micron contaminants, conventional froth flotation techniques may not produce the desired removal of colored bodies.

Selective flocculation is a procedure that is widely used commercially to separate finely divided minerals and powders. In the case of clay, some processes utilize anionic polymers to selectively flocculate the clay, leaving the impurities, such as titanium, dispersed and amenable to subsequent separation from the clay. Commercial variants of selective flocculation employ weakly anionic polymers such as hydrolyzed polyacrylamide to selectively flocculate impurities in the clay, leaving the purified clay dispersed. See, for example, U.S. Pat. No. 3,837,482 to Sheridan; U.S. Pat. No. 3,701,417 and 3,862,027, both to Mercade; U.S. Pat. No. 3,371,988 to Maynard, et al.; and U.S. Pat. No. 4,604,369 (Shi).

A variant of the selective flocculation process is where the impurities in the clay are flocculated and the clay remains dispersed in the slurry. Examples of this process are disclosed in U.S. Pat. No. 3,857,781 assigned to Huber; U.S. Pat. No. 4,604,369 assigned to Thiele; and U.S. Pat. Nos. 5,535,890 and 5,603,411 assigned to Engelhard. These processes may employ a high molecular weight organic anionic polymer, such as a water soluble polyacrylamide in excess of 1 million, or a co-polymer of acrylamide, or a copolymer of polyacrylamide and polyacrylate with 95% anionic charge and a molecular weight in excess of 5 million.

U.S. Pat. No. 4,604,369 further teaches the use of ammonium chloride as the conditioning agent and the blunging, diluting, and flocculating steps being done in a substantially continuous manner. U.S. Pat. No. 5,535,890 further teaches the use of a fatty acid and calcium chloride as the conditioning agents. U.S. Pat. No. 5,603,411 uses a mixture of dispersants including soda ash to disperse a slimed ore pulp prior to conditioning with a fatty acid, salt, and then a polymeric flocculating agent.

To achieve selective adsorption of a flocculating agent on a particular component of a mixture, a number of methods have been suggested in the literature [Yu and Attia; in "Flocculation in Biotechnology and Separation Systems," (Y. A. Attia, ed.) p. 601, Elsevier, Amsterdam 1987; Behl, S. and Moudgil, B. M., *Minerals and Metallurgical Processing*, 5, 92,1992 and, Behl, S. and Moudgil, B. M., *Journal of Colloidal Interface Science*, 160, 1993]. One of the methods involves selectively blocking the active sites on the inert or nonflocculating component for adsorption of the polymeric flocculating agent. This may be achieved by adsorption of a lower molecular weight fraction of the flocculating agent, which can act as a dispersant and/or site blocking agent prior to exposing the particle surfaces to the flocculating agent.

The selective flocculation processes employing high molecular weight anionic polymers generally suffer from the problem of low product yields due to the high molecular weight polymers attaching onto and settling with the oppositely charged cationic edges of the kaolin clay. Other disadvantages of the processes of the prior art involve a product with a relatively high degree of $TiO_2$ level such as greater than 0.50% and as high as 1.07%. Additional disadvantages are the formation of small flocs that require a longer settling time (with a larger thickener to maintain production) and minimum shear imparted on the slurry to allow settling. In addition, the presence of fatty acids because of their hydrophobicity may cause performance problems if present in the final product.

SUMMARY OF THE INVENTION

The present invention is directed to a unique selective flocculation process which produces a high yield product which is low in impurities compared to that of the prior art. For a crude kaolin clay, a high yield kaolin product lower in titanium than current competitive products is produced by the process of the invention. The present invention, preferably, involves a two-polymer system for the flocculation stage. Both a high molecular weight anionic polymer and a low molecular weight anionic polymer are used in the invention. Preferably, the low molecular weight anionic polymer is functionally different than the high molecular weight polymer. For example, it is preferred that the high molecular weight anionic polymer be a copolymer of a polyacrylamide, and the low molecular weight anionic polymer be sodium polyacrylate. It is believed that: a) the polyacrylate strongly absorbs onto the kaolin thereby protecting active sites such that the kaolin remains in suspension instead of being flocculated with the impurities; b) the polyacrylate acts to optimize the hydrodynamic characteristics to obtain optimized selective flocculations; and c) polyacrylates display miscibility with polyacrylamides to yield surprising results.

The selective flocculation process of the present invention involves the separation of constituents in a previously dispersed aqueous mineral pulp or slurry, preferably, a slurry dispersed with sodium hexametaphosphate and sodium silicate. The slurry is dispersed in the sense that the particles are not aggregated with each other. The dispersed slurry is preconditioned for subsequent selective flocculation by the addition of a water soluble source of a metal cation and halide anion, preferably, sodium chloride. If aging is to occur, it is preferable that it be done before the preconditioning stage. The selective flocculation stage involves the addition of the two-polymer system comprising both a high molecular weight anionic polymer and a low molecular weight anionic polymer, as discussed in the preceding paragraph. The addition of the low molecular weight anionic polymer may be immediately prior to or simultaneously with the addition of the high molecular weight anionic polymer, or the addition of the high molecular weight anionic polymer may precede the immediate addition of the low molecular weight anionic polymer. The preferred sequence is to add the low molecular weight anionic polymer to the dispersed and conditioned slurry followed by the addition of the high molecular weight anionic polymer. If aged, the length of the aging period may be from 15 minutes to 5 days depending on the production demands and the use of the plant facilities. The low molecular weight anionic polymer has a molecular weight of about 1,000 to 20,000, preferably, about 3500. This low molecular weight anionic polymer, preferably, is a dispersant and can be selected from the group consisting of metal salts of polyacrylic acid such as sodium polyacrylate, lithium polyacrylate, and ammonia polyacrylate, preferably sodium polyacrylate, or the acid itself. The high molecular weight anionic polymer preferably has a molecular weight between 10 and 15 million. Preferably, this high molecular weight anionic polymer is a copolymer of a polyacrylamide and being such that it performs in a fashion similar to that of other existing flocculation copolymers.

In the prior art processes, in general, when a high molecular weight anionic polymer is added to a dispersed, conditioned slurry or pulp, a dense flocculated phase forms and settles as a dense, viscous, gelatinous bottom layer; the top layer is a dispersed fluid pulp containing the non-flocculated mineral particles. In the instance where a kaolin clay is selectively flocculated, the bottom layer contains a high percentage of the titania from particles that have preferentially attached to the high molecular weight polymer and some clay, and the top layer contains a high percentage of clay and some titanium. In the invention which uses the high molecular weight anionic polymer in the presence of an active polyacrylate for the selective flocculation of a kaolin clay, the percentage of titanium and micas in the bottom layer is increased while the amount of kaolin is decreased, and the percentage of kaolin in the top layer is increased while the amount of titania and micas is decreased when compared to that of the prior art processes. The flocs are more gelatinous resulting in a better separation of the lighter kaolin enriched overflow from the mica and the titania enriched and heavier underflow.

After the selective flocculation stage, removal of the lower dense gelatinous layer from the remainder of the slurry is readily accomplished by decantation or other conventional unit operations presently used in the art. The overflow or top of the slurry containing the kaolin clay can be pumped into a storage tank for further processing required for its end use.

The use of two polymers of the invention may result in: 1) the yield of the usable, commercial product being increased by about 25% or more when compared to that of a process only using a high molecular weight polymer; 2) some crude kaolin clays, which are unresponsive or less responsive than other crude kaolin clays in that there are less active sites on these clays, now being utilized; 3) both production and capital costs being reduced in that the size of the thickener where the flocculation occurs can be reduced and the throughputs of existing thickeners can be increased as the faster forming, larger and more robust flocs allow for greater titania and mica removal under greater turbulence due to the greater throughputs; and 4) a final kaolin clay product having a percentage of titanium between 0.1% and 0.5%, a reduced level of mica, and a G.E. or % brightness greater than 89.5, and preferably at least 91.5.

The invention involves the addition of low levels of sodium polyacrylate prior to or at the addition point of the high molecular anionic polymer to the dispersed, conditioned slurry for the selective flocculation process where the titania and micas are flocculated and the clay remains in suspension.

These and other objects of the invention will be better appreciated and understood by those skilled in the art when the following description is read with reference to the drawing and the appended claims.

BRIEF DESCRIPTION OF THE DRAWING

The single drawing represents a flow diagram of a selective flocculation process employing the present invention.

DETAILED DESCRIPTION OF THE INVENTION

The present invention is directed to the selective flocculation of finely divided particles in a mixture of at least two kinds of minerals. This process is capable of removing titania (rutile and anatase and mixture thereof) and micas from crude kaolin clay which clay is in the form of particles finer than 325 mesh. The result is that the titania and mica impurities are removed from the clay in order to improve the brightness and the shade of the clay. The method of the invention employs in the flocculation stage both a high molecular weight anionic polymer and a low molecular weight polymer, such as sodium polyacrylate which generally is used as a dispersant. It is believed that the addition of the low molecular weight anionic polymer after salt conditioning of the kaolin clay slurry strongly absorbs onto the kaolin to protect the active sites of the clay from attachment by the high molecular weight polymer, therefore inhibiting or resisting the settling and incorporation of this kaolin clay with the titania-mica enriched underflow, resulting in an increase in yield of the overall final product which is more enriched in kaolin and less in titania and micas. The polyacrylate is believed to optimize the results of the selective flocculation process.

I. GENERAL PROCEDURE

A general and typical procedure of a preferred embodiment of the present invention is illustrated in the single drawing which shows the process of a selective flocculation for kaolin clay in a pilot plant of the assignee of the invention, which plant is located in Sandersville, Georgia.

A. Dispersion of Crude

The crude may be metered by feed screw 10 to a blunger 12 where it is dispersed to a minimum viscosity at a slurry solids of from 50 to 70 percent by weight. The dispersant may typically be comprised of 5 pounds of sodium hexametaphosphate (active basis) per dry ton of clay and from 4 to 6 pounds of sodium silicate (active basis) per dry ton of clay. The sodium silicate may have a molecular ratio of 3.2 $Na_2O$: 1.0 $SiO_2$. The sodium hexametaphosphate may have a molecular ratio of 1.1 NaO; 1.0 $P_2O_5$ with a minimum of 65 percent $P_2O_5$, and may be obtained from the Calgon Corporation, Pittsburgh, Pa. The pH of the slurry may be about 6.4 to 7.0.

The dispersed clay slurry may then be passed through a Cowles mixer 14 or similar high shear mixer, and then degritted using a SWECO® screen 16 or similar device to remove 100+ mesh particles. Optionally, the degritting step may be conducted prior to the high shear mixing in order to reduce wear on the mixing blade. After fully dispersing and degritting the clay slurry, the slurry may be passed to storage tank 18 where it is diluted to 20 to 40 percent solids, preferably, 30 percent solids by weight. The slurry may be aged from anywhere from 15 minutes to days in storage tank 18 at this point, however, aging is not necessary.

B. Magnetic Separation

The diluted slurry may then be metered to a high intensity wet magnetic separator or a super conducting wet magnetic separator indicated at 20 in the drawing for removal of the iron bearing impurities. The product from this process is then diluted to 25 percent solids by weight and may be stored and/or aged in tank 22. The impurities are discarded as indicated at numeral 24. This magnetic separation process may be optional and may be employed in a sequence different than illustrated in the drawing.

C. Salt Treatment of Diluted Slurry

The diluted slurry at 25 percent solids by weight may then be treated with a 10 to 25 percent by weight sodium chloride (NaCl) solution added at a rate of from 5 to 40 pounds per dry ton of clay with 20 pounds being typical. The sodium chloride may be added to the diluted clay slurry as the slurry exits from tank 24 (indicated by arrow 26) through use of static mixers. The slurry may be stored in tank 24 for an indefinite period of time or it may be passed to header tank 28 where the two polymers of the invention are added to the slurry. If any aging of the slurry is to occur, preferably, it should be done before this preconditioning step.

D. Addition of The Polymers

When the slurry is passed to header tank 28, it is treated with a low molecular weight anionic polymer, preferably, a polyacrylate, which preferably is a sodium polyacrylate which may be that which is commercially available under the tradename C-211 obtained from Rhone-Poulenc. This polyacrylate may be added in a dosage of 0.1 to 5.0 pounds (active basis) in a 3.8 to 20 percent solution by weight per dry ton of clay. The clay slurrylpolyacrylate mixture is then treated with a high molecular weight anionic polymer in a dosage of 0.01 to 0.5 pounds (active basis) in 0.02 to 0.1 percent solution by weight per ton of clay.

It should be noted that the addition of polyacrylate immediately prior to the addition of the high molecular weight polymer seems to perform the best, but the addition may be done simultaneous with the high molecular weight polymer, or the high molecular weight anionic polymer may be added first followed by the addition of the low molecular weight polymer or both polymers may be brought together as a mixture and then added to the slurry. The addition of these two polymers to the clay slurry in tank 28 are represented in the drawing by arrows 30 and 32.

The high molecular weight anionic polymer, preferably, has a molecular weight in excess of one million, preferably, in the range of 10 to 15 million and preferably, is a copolymer of a polyacryamide. The high molecular weight polymer used in the invention may be any one of those used in the prior art selective flocculation processes, or any one of those commercially available. A suitable high molecular weight polymer which was used in the invention is Nalco 7766, supplied by the Nalco Corporation. The low molecular weight anionic polymer has a molecular weight of about 1,000 to 20,000, preferably 3500. A suitable polymer which was used in the examples is C-211, discussed hereinabove, is sodium polyacrylate.

E. Mixing During Addition of Polymers/Water

Since less agitation results in poor selectivity and high shear results in the shearing of flocs, the degree of agitation applied to the clay slurry must be sufficient to incorporate the polyacrylate solution, the water, and the high molecular weight polymer solution into the clay slurry. Agitation may be carried out in header 28 by mechanical means, or optionally, in-line by use of static mixers.

F. Sedimentation of Titania Enriched Flocs

The sedimentation of the flocs which are enriched with titania and micas is rapidly accomplished in a high rate thickener device 34 where the clay slurry is adjusted to between 10 and 35 percent solids by weight. (The thickener device 34 is a device well-known to those skilled in the art.) As the slurry treated with the two polymers is metered into thickener device 34, the flocs begin to settle out of the suspension at a rate of 2 to 10 inches per minute. The flocs, enriched with the titanium, the micas, the high molecular weight polymer, and perhaps a residue of the sodium polyacrylate which does not react with the clay, are gravity settled and drawn off the bottom of thickener device 34, as an underflow indicated by arrow 36, at a solids of between 35 to 65 percent by weight. The refined clay slurry is collected from the overflow weir, as indicated by arrow 38, and is pumped into a storage tank 40 for further processing required for end use performance. This further processing may include ozoning indicated at 42, bleaching indicated at 44, and filtering indicated at 46, followed by either redispersing in a make down tank for shipment as a slurry as indicated at 48 or alternately spray drying for shipment as a dry product as indicated at 50. These processes are well-known to those skilled in the art and are standard processes for the beneficiation of a kaolin clay.

II. EXAMPLES

In the following examples, an East Georgia crude kaolin clay possessing a brightness of 81 percent and impurities comprising 2.5 percent titanium dioxide (TiO2) and 1.1 percent iron oxide (FeO) was treated. The high molecular weight anionic polymer used in the examples is a commercially available polymer having a molecular weight range from 10–15 million and available from the Nalco Corporation under the tradename "Nalco 7766".

Example 1

A sample of the East Georgia crude clay described hereinabove was formed into a slurry, which was dispersed and conditioned with the chemicals as described hereinabove. The slurry after being salt treated with NaCl was divided into two portions. To the first portion, 0.25 lb. (active basis) per dry ton of the high molecular weight anionic polymer (Nalco 7766) in 0.025% solution was added. The resulting slurry was diluted to 20% solids and subjected to the selective flocculation process without the addition of the sodium polyacrylate. After allowing for separation, the usable product obtained from thickener device 34 had a $TiO_2$ level of 0.30% and a product yield of 51.5%. After additional processing such as described hereinabove, the final kaolin clay product had a brightness of 91.5.

The second portion of this slurry with only the NaCl addition was mixed with 0.38% (active basis) sodium polyacrylate (C-211) in 3.8% solution. To this, was added 0.25 lb. (active basis) in 0.025% solution per dry ton Nalco 7766 polymer. The resultant slurry was diluted to 20% solids by weight and subjected to selective flocculation. After allowing for separation, the usable product had a TiO$_2$ level of 0.32% and a product yield of 63.3%. After additional processing such as that discussed hereinabove, the brightness of the final product was 91.5.

While the TiO$_2$ measurements are within experimental error for both portions of this sample, the addition of both sodium polyacrylate and the high molecular anionic polymer in the second portion had increased the yield of the usable product from 51.5% (first portion) to 63.3% (second portion), which is a 23% increase in yield.

Example 2

A further sample of the East Georgia kaolin crude kaolin clay described hereinabove was formed into a slurry which was dispersed and conditioned with NaCl. This slurry was divided into four portions. A first portion containing the NaCl addition was mixed with 0.25 lb (active basis) per dry ton of Nalco 7766 anionic polymer in 0.025% solution. The resultant slurry was diluted to 20% solids, by weight, and subjected to selective flocculation. After allowing for separation, the product had a TiO$_2$ level of 0.70% and a yield of 61.5%. This product was considered to be "unacceptable" in that it contained small flocs enriched with titania and micas. These small flocs had not settled out of suspension due to "poor" flocculation. After additional processing, the brightness of the final product was 90.0.

A second portion of this slurry having the NaCl addition was mixed with a 0.38% (active basis) sodium polyacrylate (C-211) in 38% solution and the 0.25 lb. (active basis) per dry ton of Nalco 7766 polymer in 0.025% solution. The slurry was dilute d to 20% solids by weight and underwent selective flocculation. After allowing for separation, the usable product, in that it contained no visible titania flocs, had a TiO$_2$ level of 0.47% and a product yield of 75.2%. After additional processing, the final brightness was 90.9.

A third portion of this slurry containing the NaCl addition was mixed with a 0.54% (active basis) sodium polyacrylate (C-211) in 3.8% solution and the 0.25 lb. (active basis) per dry ton of Nalco 7766 polymer in 0.025% solution. The slurry was diluted to 20% solids, by weight, for the selective flocculation process. After allowing for separation, the usable product (no visible flocs) had a TiO$_2$ level of 0.47% and a product yield of 79.6%. After the additional processing the final brightness was 90.9.

A fourth portion of this slurry containing NaCl addition was mixed with 0.25 lb. (active basis) in 0.025% solution per dry ton of Nalco 7766 polymer. This was mixed with 0.76% (active basis) sodium polyacrylate (C-211) in 3.8% solution. The slurry was diluted to 20% solids for selective flocculation. After allowing for separation, the usable product (no visible flocs) had a TiO$_2$ level of 0.44% and a product yield of 72.6%. After additional processing, the final brightness was 90.9.

This Example 2 again demonstrates that the addition of both a low and a high molecular weight anionic polymer, as particularly exemplified by the latter three portions of the sample, increases the usable product yield by about 25% as evidenced by 75.2%, 79.6%, and 72.6%, respectively, when compared to that of 61.5% of the first portion. Additionally, these results show that the use of the two polymers in the second, third, and fourth portions of the sample may allow for the successful processing of a previously low responsive crude, such as evidenced by the first portion where only the high molecular weight polymer was used and where an unacceptable product was produced. When particularly comparing the first portion to the fourth portion, the addition of the sodium polyacrylate to the fourth portion seems to have caused a denser flocculation and the production of an acceptable commercial product. Further, the products of the second, third, and fourth portions (produced according to the teachings of the invention) contained a lower titanium oxide level when compared to that of the first portion. That is, the TiO$_2$ levels for the second, third, and fourth portions were 0.47%, 0.47%, and 0.44%, respectively, whereas, that for the first portion was 0.70%.

Example 3

A third sample of the East Georgia crude kaolin clay described hereinabove was formed into a slurry which was dispersed and conditioned with NaCl. This slurry was divided into two portions.

To the first portion, 0.25 lb. (active basis) in 0.025% solution per dry ton of Nalco 7766 polymer was added. The slurry was adjusted to 20% solids by weight for the flocculation process. After separation, a usable product (no visible flocs) had a TiO$_2$ level of 0.39% and a yield of 42.4%. After further processing, the final brightness was 91.3. In a Kynch Settling Test designed to quantify settling rates and to design thickener devices, a rate of 3.0 inches per minute was obtained.

A second portion with the NaCl addition was mixed with both a 0.76% (active basis) sodium polyacrylate (C-211) in 3.8% solution and 0.25 lb. (active basis) in 0.025% solution per dry ton of Nalco 7766 polymer. The slurry was diluted to 20% solids for selective flocculation. After allowing for separation, a usable product (no visible flocs) had a TiO$_2$ level of 0.35% and a product yield of 71.4%. After further processing, the brightness of the final product was 91.3. The Kynch Settling Test showed a rate of 8.6 inches per minute which was an increase of 5.6 inches per minute from the 3.0 inches per minute for the first portion.

These results for this Example 3 again demonstrate that the final product yield is increased when the two polymers of the invention are used as compared to when only the high molecular weight polymer is used. That is, the product yield for the first portion was 42.4% compared to a product yield of 71.4% for the second portion. This is an increase of 68%. These results also show a 286% increase in the settling rates. This fact can be translated to mean that the size of the thickener device can be decreased from that of conventional thickeners while still maintaining or increasing the throughput or production rate of the thickener device, which, in turn, can result in a reduction in both capital and production costs. Further, these results of Example 3 demonstrate a decrease in the TiO$_2$ levels of the final product of the invention (second portion) with a 0.35% TiO$_2$ level when compared to a product produced with only the high molecular weight anionic polymer (first portion) which had a 0.39% TiO$_2$ level.

While the present invention has been particularly set forth in terms of specific embodiments thereof, it will be understood in view of the instant disclosure that numerous variations upon the invention are now enabled to those skilled in the art, which variations yet reside within the scope of the present invention. Accordingly, the invention is to be broadly construed and limited only by the scope and spirit of the claims now appended hereto.

What is claimed is:

1. A method for a selective flocculation of finely divided kaolin clay particles from a kaolin crude containing impurity particles, comprising:

(a) forming said crude clay containing kaolin clay particles and said impurity particles into a dispersed aqueous slurry by adding at least one dispersant to said crude;

(b) adding one conditioning agent to said dispersed aqueous slurry to condition said slurry, said conditioning agent being a source of inorganic monovalent cation;

(c) flocculating said conditioned slurry by adding to said conditioned slurry a low molecular weight anionic polymer having a molecular weight ranging from about 1000 to about 20,000 and a high molecular weight anionic polymer having a molecular weight ranging from about 10 to about 15 million to flocculate said impurity particles, which flocs settle as a dense lower layer; and (d) removing said settled dense lower layer from said aqueous slurry; and wherein the use of said low molecular weight anionic polymer and said high molecular weight anionic polymer in step (c) increases the yield of said kaolin clay particles without aging in step (b).

2. The method of claim 1 wherein said conditioning agent ranges from about 5 to about 40 pounds per ton of crude.

3. The method of claim 2 wherein said conditioning agent is about 20 pounds per ton of crude.

4. The method of claim 1 wherein said impurity particles comprise colored titania.

5. The method of claim 1 wherein said flocs settle at a Kynch Settling Test rate of at least 3.0 inches per minute thereby increasing the production rate of said kaolin clay.

6. The method of claim 1 wherein said low molecular weight anionic polymer is added immediately prior to or simultaneously with the high molecular weight anionic polymer.

7. The method of claim 1 wherein two dispersants are added in step (a), said two dispersants being sodium silicate and sodium hexametaphosphate.

8. The method of claim 1 wherein said conditioning agent in step (b) is sodium chloride.

9. The method of claim 1 wherein said high molecular weight anionic polymer is a copolymer of a polyacrylamide.

10. The method of claim 1 wherein said low molecular weight anionic polymer is selected from the group consisting of metal salts of polyacrylic acid and a polyacrylic acid.

11. The method of claim 10 wherein said molecular weight of said low molecular weight anionic polymer is about 3500.

12. The method of claim 10 wherein said metal salts of polyacrylic acid is selected from the group consisting of lithium polyacrylate, ammonium polyacrylate and sodium polyacrylate.

13. The method of claim 12 wherein said metal salt of polyacrylic acid is sodium polyacrylate.

14. A kaolin product produced according to the process of claim 1 having a field ranging from 63.3% to 79.6% and having a titanium level of about less than 0.5% and a brightness of about at least 89.0.

15. A method of claim 1 wherein said yield of said kaolin clay particles ranges from 63.3% to 79.6%.

* * * * *